United States Patent
Dean

(10) Patent No.: US 7,279,234 B2
(45) Date of Patent: Oct. 9, 2007

(54) METHODS FOR IDENTITY VERIFICATION USING TRANSPARENT LUMINESCENT POLYMERS

(75) Inventor: David M. Dean, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 316 days.

(21) Appl. No.: 10/921,436

(22) Filed: Aug. 18, 2004

(65) Prior Publication Data

US 2005/0042428 A1     Feb. 24, 2005

Related U.S. Application Data

(60) Provisional application No. 60/497,261, filed on Aug. 22, 2003.

(51) Int. Cl.
*C09K 11/06* (2006.01)
*B32B 33/00* (2006.01)

(52) U.S. Cl. .......... 428/690; 252/301.16; 528/278; 526/192; 534/16; 534/15; 525/191; 525/201; 525/221; 525/223; 525/227; 525/418

(58) Field of Classification Search .......... 428/690; 25/301.16, 301.34; 528/278; 526/192; 534/16, 534/15; 525/191, 201, 221, 223, 227, 418
See application file for complete search history.

(56) References Cited

U.S. PATENT DOCUMENTS

| | | | |
|---|---|---|---|
| 6,141,465 A | 10/2000 | Bischel et al. | |
| 6,165,609 A | 12/2000 | Curatolo | |
| 6,402,986 B1 | 6/2002 | Jones, II et al. | |
| 2001/0030325 A1 * | 10/2001 | Epstein et al. | ................ 257/79 |

FOREIGN PATENT DOCUMENTS

| | | | |
|---|---|---|---|
| JP | 02-254402 | * | 10/1990 |
| JP | 02-254402 | * | 10/1999 |
| JP | 2000-204364 | * | 7/2000 |
| WO | WO 02/58084 | * | 7/2002 |
| WO | WO 02/68560 | * | 9/2002 |

OTHER PUBLICATIONS

Kido et al, Organo Lanthanide Metal Complexes for Electroluminescent Materials, Chem. Rev. 2002, No. 102, pp. 2357-2368, May 15, 2002.*

Padmavathy Rajagopalan, et al., Synthesis and Near Infrared Properties of Rare Earth Ionomers, Journal of Polymer Science, Part B, Polymer Physics, 1996, 151-161, vol. 34.

Yoshiyuki Okamoto, Synthesis, Characterization, and Applications of Polymers Containing Lanthanide Metals, J. Macromol. Sci.-Chem., 1987, 455-477, vol. A24 (3&4).

Rajagopalan, Padmavathy et al., Spectral studies of novel lanthanide-containing polymers by near-infrared and FT-Raman spectroscopy, Journal of Molecular Structure, 1997, vol. 405, pp. 59-55, Elsevier Science B.V.

* cited by examiner

*Primary Examiner*—C. Melissa Koslow

(57) ABSTRACT

Disclosed are methods of using a transparent, luminescent polymer for transparent marking and/or labeling for identity verification purposes. Also disclosed are sheets, films, markers, labels and taggants comprising transparent, luminescent polymers. Also disclosed are articles labeled with a transparent, luminescent polymer. This invention particularly relates to use of transparent, luminescent polymer compositions comprising ethylene (meth)acrylic acid copolymers and rare earth ions and transparent, luminescent polymer compositions comprising methyl (meth)acrylate/(meth)acrylic acid copolymers, fatty acids and rare earth ions for these purposes.

8 Claims, No Drawings

METHODS FOR IDENTITY VERIFICATION USING TRANSPARENT LUMINESCENT POLYMERS

This application claims the benefit of U.S. Provisional Application No. 60/497,261, filed Aug. 22, 2003.

FIELD OF THE INVENTION

This invention relates to methods of using a transparent, luminescent polymer for transparent marking and/or labeling for identity verification purposes. This invention further relates to sheets, films, markers, labels and taggants comprising a transparent) luminescent polymer. This invention particularly relates to use of transparent, luminescent polymer compositions comprising either ethylene (meth)acrylic acid copolymers and rare earth ions or transparent, luminescent polymer compositions comprising methyl (meth)acrylate/(meth)acrylic acid copolymers, fatty acids and rare earth ions for these purposes wherein (meth)acrylare refers to acrylate or methacrylate and (meth)acrylic acid refers to acrylic acid or methacrylic acid.

BACKGROUND OF THE INVENTION

Accurate verification of products and documents is critical to a wide variety of industries including the manufacture of pharmaceutical, clothing, automotive parts, and the issuance of credit and identification cards or travel/immigration documentation. Counterfeiters of products, currency and documents have developed increasingly sophisticated methods of detecting and copying of marks and labels.

Counterfeiting and product diversion cost owners of products, brand names, and intellectual property billions of dollars annually on a worldwide basis, according to the International Anti-Counterfeiting Council (IACC). The problem in the United States, for example, encompasses an estimated loss in revenues of $200 billion per year, as well as associated costs in tax revenues and the loss of jobs.

Thus, there is a well-recognized need for tagging, marking and/or labeling for identification purposes, such as those used for product identification, product tracking and anti-theft applications. Such labeling generally is readily detectable by visual means. Bar codes such as are conventionally used in many commercial applications today would be an example of such visible labels.

U.S. Pat. No. 6,402,986 discloses the use of luminescent compositions comprising lanthanide chelates for verification of products or documents.

U.S. Pat. No. 6,165,609 discloses security coatings for labels that cannot be detected by the naked eye, but can be detected by a detector.

The range of goods that need to be verified is large and continuing to grow. Accordingly, there is a continuing need to develop new compositions and methods for product verification and security identification of goods and documents in common use.

A transparent polymer that exhibits a luminescent response would be extremely useful in transparent markers, taggants or labels, or in a number of other potential uses, such as tagged or identifiable packaging film.

Merely blending rare earth oxide or sulfide particles within a polymer matrix would produce a filled polymer material that possessed a luminescent response. However, since the particles are larger than most wavelengths of light, the filled system would scatter incident waves of light resulting in a material that is not transparent.

Rajagopalan, Tsatsas and Risen, Jr. have prepared ionomers of ethylene acrylic acid (EAA) copolymer and ethylene methacrylic acid (EMA) copolymer, in which the copolymers were neutralized with $Dy^{3+}$, $Er^{3+}$, $Sm^{3+}$, $Tb^{3+}$, $Tm^{3+}$, and $Yb^{3+}$, and mixtures thereof. See Rajagopalan, et. al., "Synthesis and Near Infrared Properties of Rare Earth Ionomers", *Journal of Polymer Science: Part B: Polymer Physics*, vol. 34, 151-161 (1996). They report that these ionomers have valuable optical properties and that they exhibit strong Raman scattering and luminescence in the near infrared (IR) region.

Polymers containing lanthanide metal ions, specifically $Eu^{3+}$ and $Tb^{3+}$ salts are disclosed in Y. Okamoto, "Synthesis, Characterization, and Application of Polymers Containing Lanthanide Metals", *J. Macromol. Sci.-Chem.*, A24(3&4), pp. 455-477 (1987). The polymers used include poly(acrylic acid), poly(methacrylic acid), partially sulfonated or carboxylated styrene, styrene-acrylic acid copolymers and methyl methacrylate-methacrylic acid copolymers. The fluorescent intensity of these polymers was studied. The polymers made appear to contain up to 8 weight % $Tb^{3+}$ and up to 10-11 weight % $Eu^{3+}$, though the fluorescence intensity for the $Eu^{3+}$-polymer salts reached a maximum at 4-5 weight % $Eu^{3+}$ content.

Paramagnetic polymer compositions comprising lanthanide metal ions, specifically $Gd^{3+}$, $Tb^{3+}$, $Dy^{3+}$, $Ho^{3+}$, $Er^{3+}$ and $Tm^{3+}$, are disclosed in WO02/058084.

SUMMARY OF THE INVENTION

In one aspect, the present invention is a method for verifying the authenticity of an article comprising the step: providing a transparent, luminescent polymer composition comprising a polymer complexed with one or more rare earth ions selected from the group consisting of elements 63 through 69 of the Periodic Table of the Elements, wherein the polymer is in the form of a sheet, film, marker, label or taggant, and the rare earth ions are included in an amount sufficient to be detected by a means for detecting luminescence.

In another aspect, this invention provides a method for identity verification comprising the steps:
(a) providing (i) a transparent, luminescent polymer composition comprising a polymer complexed with one or more rare earth ions selected from the group consisting of elements 63 through 69 of the Periodic Table of the Elements wherein the polymer is in the form of a sheet, film, marker, label or taggant; and (ii) a means for detecting the luminescence of the polymer;
(b) detecting the luminescence of said polymer composition; and
(c) characterizing the luminescence of said polymer composition.

More particularly, this invention provides for the above method using a transparent, luminescent polymer composition comprising an ethylene (meth)acrylic acid copolymer complexed with one or more rare earth ions (that is, elements 63 through 69 of the Periodic Table of the Elements) in sheets, films, markers, labels and taggants.

More particularly, this invention also provides for the above method using a transparent, luminescent polymer composition comprising a copolymer of alkyl (meth)acrylate and (meth)acrylic acid complexed with one or more rare earth ions in sheets, films, markers, labels and taggants. Preferably, the amount of rare earth ions in these compositions is less than about 9 weight % based on the total weight of the polymer composition.

This invention provides a transparent, luminescent label for an article, said label comprising a polymer complexed with one or more rare earth ions selected from the group consisting of elements 63 through 69 of the Periodic Table of the Elements, the label being free of optical detection by a person with 20/20 vision from a distance of 1 meter (3 feet) or more. The label transparency preferably is such that it is possible to transmit at least 55% of the incident light/radiation through a 3 mm (⅛ inch) thick test piece of the label material for greater than 50% of the wavelengths in the range of 400 to 1800 nanometers (nm).

This invention also provides an article to which is bonded a transparent, luminescent label comprising a polymer complexed with one or more rare earth ions selected from the group consisting of elements 63 through 69 of the Periodic Table of the Elements, the label being free of optical detection by a person with 20/20 vision from a distance of 1 meter (3 feet) or more. The label transparency preferably is such that it is possible to transmit at least 55% of the incident light/radiation through a 3 mm (⅛ inch) thick test piece of the label material for greater than 50% of the wavelengths in the range of 400 to 1800 nanometers (nm), said label being in the form of a film, particle, fiber, or ink.

In another aspect, the present invention is a monolayer or multilayer sheet or film for use as a marker, label, taggant or packaging film comprising at least one layer of a transparent, luminescent polymer composition comprising a polymer complexed with one or more rare earth ions selected from the group consisting of elements 63 through 69 of the Periodic Table of the Elements.

In another aspect, the present invention is a transparent, luminescent polymer composition comprising:

(i) at least one E/X/Y copolymer where E is ethylene, X is a $C_3$ to $C_8$ α,β ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer; and (ii) from about 1 weight % to about 30 weight % of one or more organic acids or salts thereof;

wherein the combined carboxylic acid functionalities in all ingredients in the composition are at least partially neutralized by a rare earth cation selected from europium or terbium and optionally one or more additional rare earth cations.

This invention also provides a transparent, luminescent polymer composition comprising:

(i) a copolymer comprising at least one alkyl acrylate or alkyl methacrylate and at least one acid selected from acrylic acid or methacrylic acid; and (ii) from about 1 weight % to about 30 weight % of one or more organic acids or salts thereof;

wherein the combined carboxylic acid functionalities in all ingredients in the composition are at least partially neutralized by a rare earth cation selected from europium or terbium and optionally one or more additional rare earth cations.

The transparent, luminescent polymer composition useful in this invention may further comprise at least one additive that can also complex with the rare earth cations therein. Accordingly, this invention also provides sheets or films, labels, and articles to which these labels are bonded wherein said transparent, luminescent polymer composition further comprises at least one additive that can also complex with the rare earth cations therein. This invention also provides for the method for identity verification using said transparent, luminescent polymer compositions that further comprise at least one additive that can also complex with the rare earth cations therein.

DETAILED DESCRIPTION OF THE INVENTION

DEFINITIONS

By "copolymer," it is meant a polymer obtained by copolymerization of two or more comonomers. The term "copolymers" as used herein includes terpolymers, which are copolymers comprising three comonomers, and higher order copolymers. The term "copolymer" includes random or statistical copolymers and block copolymers. The more specific description "ethylene (meth)acrylic acid copolymer", and the like, is also meant to include copolymers which may have a third monomer present.

For example, "Ethylene/(meth)acrylic acid (abbreviated E/(M)AA)" means a copolymer of ethylene (abbreviated E)/acrylic acid (abbreviated AA) and/or ethylene/methacrylic acid (abbreviated MM). Copolymers useful in this invention include E/(M)AA dipolymers having from about 2 to about 30 weight % (M)AA, at least partially neutralized as described below. Terpolymers can also be made from an olefin such as ethylene, an unsaturated carboxylic acid and other comonomers such as alkyl (meth)acrylates. These copolymers can then be at least partially neutralized by one or more rare earth metal cations to form an ionomeric polymer useful in this invention.

The term "halo or halide" refers to fluoro, chloro, bromo, or iodo or the corresponding halides.

By "ionic domain size" is meant regions in a polymer composition that primarily comprise aggregated rare earth ions, typically identified by means of x-ray scattering studies which reveal electron density differences in such regions compared to the remainder of the composition. Such regions usually have an electron density that is higher than the remainder of the polymer due to increased concentration of electrons.

Luminescence is the property of emitting radiation as the result of absorption of radiation from another source, resulting from de-excitation of a molecule or ion from an excited electronic state to its ground electronic state. The emitted radiation is referred to as fluorescence if the excited and ground electronic states are of the same spin multiplicity (de-excitation does not require a change in spin angular momentum); the emitted radiation is known as phosphorescence if de-excitation is "spin forbidden," requiring a change is spin in angular momentum. Delayed luminescence is a process of light emission that is normally much less efficient than the commonly observed fluorescence associated with many colored materials. When these two types of emission are time-resolved, normal fluorescent light appears in the time domain of nanoseconds ($10^{-9}$ second), following an initiating light pulse. Typically, in fluorescence, the emitted radiation appears to persist only as long as the exposure to the external excitation source. The processes of long-lived luminescence known as delayed fluorescence or phosphorescence are active in the time domain of microseconds to seconds (and occasionally longer times). Delayed fluorescence can occur on a time scale that is sufficiently slow that detection apparatus based on less sophisticated electronics or on mechanical "chopping" will suffice. Because of the time delay, phosphorescence can result in the emission of light that persists after removal of the excitation source. Compositions useful in this invention are uniquely luminescent at various wavelengths, and the light emitted from the composition can be detected to allow for a comparison that utilizes the composition's unique qualities of image, wavelength, and time scale. Measurement of the luminescence, including decay lifetimes, provides unique "fingerprints" of the luminescent compositions, for purposes of characterization and comparative analysis. Luminescence decay lifetimes are variable, and are reproducible and adjustable with the addition of luminescence lifetime modifiers to the compositions, which provide for multivariate lifetime imaging. In some embodiments of this invention, the transparent, luminescent compositions are applied in a pattern (i.e. an uneven distribution over an area), which allows the luminescence of the compositions to be further characterized by the pattern of luminescence observed.

Generally, luminescent radiation has a longer wavelength than that of the absorbed radiation. In referring to a composition or article as "luminescent," it is meant that the composition or article exhibits luminescence including fluorescence, delayed fluorescence or phophorescence. For example, when irradiated with ultraviolet radiation (wavelengths in the range of 200 to 400 nm), a luminescent composition or article of this invention will emit visible light (wavelengths in the range of 400 to 700 nm). More specifically, compositions containing europium luminesce with spectra characterized by a strong emission line from about 615 to about 619 nm; compositions containing terbium luminesce with spectra characterized by a strong emission line from about 542 to about 546 nm.

In referring to a composition or article as "transparent," it is meant that it is possible to transmit at least 55%, preferably 65%, more preferably 75%, of the incident light/radiation through a ⅛ inch thick piece of the composition or article material for greater than 50% of the wavelengths in the range of 400 to 1800 nm. The test for transparency follows the steps outlined in ASTM Standard D1746-97, "Standard Test Method for Transparency of Plastic Sheeting." The preferred wavelength(s) of the source of incident light/radiation to determine transparency for compositions disclosed herein will typically vary with the composition. However, for most applications, the source of incident light/radiation is preferably a laser operating at one of the following wavelengths: 1550 nm, 1500 nm, 1300 nm, 900 nm, 650 nm and 570 nm. The light/radiation source may also operate at a plurality of wavelengths. If so, a wavelength-tunable filter is preferred for such a source. The light/radiation source may also provide at least a portion of the wavelengths in the range of 400-4000 nm in combination with a wavelength-tunable filter. Radiation sources and wavelength-tunable filters are generally known to those skilled in the art. For guidance and information, see U.S. Pat. No. 6,141,465, which is incorporated by reference herein.

Compositions

The invention herein provides transparent, luminescent compositions comprising a polymer having complexed with it a sufficient amount of one or more rare earth cations to provide a luminescent response such that at least one emission wavelength peak, characteristic of the rare earth luminescence, is observable, preferably with sufficient peak initial intensity to determine a decay lifetime.

Suitable rare earth elements include europium, gadolinium, terbium, dysprosium, holmium, erbium and thulium, element numbers 63 through 69 of the Periodic Table of the Elements. The preferred rare earth elements for use in the invention herein are element numbers 63 through 65; more preferably 63 and 65 (europium and terbium); and most preferably 63 (europium).

Each of the rare earth ions luminesces with a characteristic spectrum and emission lifetime corresponding to the energy released when excited electrons relax to their ground state. For example, europium luminesces with a spectrum characterized by a strong emission line from about 615 to about 619 nm; terbium luminesces with a spectrum characterized by a strong emission line from about 542 to about 546 nm. In addition, the decay time for the luminescence is also dependent on the rare earth and its environment within the composition and the source of excitation energy. For example, shortening of fluorescence lifetimes, that is, super-fluorescence, can be effected by a pulse from a xenon flashlamp. Additives that can complex with the rare earth ions (i.e., ligands including, but not limited to, 1,3-diketones; heterocyclic compounds, including bi- and terpyridines, imidazoles and derivatives and analogs thereof; polycyclic azaaromatic compounds; dipicolinic acids; coumarins; phenols, amino acids such as iminodiacetic acid; and salicylic acids) may also modify the luminescence lifetime. Of particular note are ligands derived from 4-alkynyl-2,6-pyridinedicarboxylic acids, including those described in U.S. Pat. No. 6,402,986, incorporated herein by reference. Another feature of the observed luminescence may be a change in peak emission intensity that is observed for the principal lanthanide emission bands on addition of a luminescence lifetime modifier. As such, a composition of this invention will have a signature spectrum that is identifiable depending on the rare earth ion(s) present in the composition and/or other additives. The reading of specific wavelengths of emitted light, or the comparison of luminescent images through the use of any of a number of photodetectors, including spectrometers, florimeters, and phosphorimeters is contemplated, as described more fully below.

The presence of the rare earth elements in the composition imparts a luminescent property. As such, the more rare earth element that can be incorporated into a specific polymer, the stronger the possible luminescent behavior. However, considerations of cost, ease of handling, mechanical properties, etc. tend to favor lower amounts of the rare earth element in the composition. Thus, the amount of the rare earth elements complexed with the polymer preferably is sufficient to obtain a luminescent behavior such that at least one emission wavelength peak, characteristic of the rare earth luminescence, is observable. The rare earth ions are present preferably in an amount of less than about 9 weight %, more preferably less than about 3 weight %, based on the total weight of the polymer composition.

Rare earth compounds suitable for preparing a composition useful in this invention include rare earth oxides, acetates, carbonates, acetyl acetonates, sulfides and chlorides, preferably rare earth acetates or acetyl acetonates. One or more rare earth elements can be used to form the rare earth compound, preferably a salt. The ionic domain size of the aggregated rare earth ions within the polymer is preferably in the range of less than 10% of the length of the wavelength of light that is being transmitted through the polymer, typically less than about 100 nm.

The rare earth elements are preferably added as salts, preferably finely divided or soluble salts, during polymerization of acrylic compositions. Alternatively, the rare earth elements are added as salts, preferably finely divided or soluble salts, to neutralize acid-containing polymers. Accordingly, the transparent, luminescent composition is made by complexing a finely divided source of rare earth cations with a polymer having moieties that contain acid functionality, the acid functionality level preferably being sufficiently high to complex essentially all of the rare earth cations present in the composition.

The polymer may be a homopolymer or copolymer, but preferably is a copolymer. Suitable monomers to form a copolymer include at least one of (meth)acrylates and/or (meth)acrylic acids. Fluoro- and chloro-acrylic polymers are also suitable. Suitable (meth)acrylate monomers may include acrylic esters (e.g., methyl acrylate, ethyl acrylate, propyl acrylate and butyl acrylate), methacrylic esters (e.g., cyclohexyl methacrylate, benzyl methacrylate, methyl methacrylate, ethyl methacrylate, propyl methacrylate and butyl methacrylate), styrene and methylene butyrol lactone (MBL), preferably methacrylic esters, most preferably methyl methacrylate. The preferred acid monomer is selected from acrylic acid and methacrylic acid. Preferably, monomers with nitrogen-containing groups are not included in the composition claimed herein. When used as an ink or coating, di- or tri-functional acrylates, such as tridecyl acrylate, tridecyl methacrylate, trimethylolpropane triacrylate or trimethylolpropane trimethacrylate may also be used to help crosslink the composition. These di- or tri-functional acrylates are available from Sartomer, Exton, Pa.

Preferred transparent, luminescent polymer compositions of the invention herein include ethylene (meth)acrylic acid copolymers complexed with the rare earth ions.

We have found that use of organic acids as described above can facilitate fine, uniform dispersion of the rare earth cations in the polymer matrix, thereby improving the transparency of the polymer composition.

Accordingly, a preferred transparent, luminescent polymer composition useful in this invention comprises:

(i) at least one E/X/Y copolymer where E is ethylene, X is a $C_3$ to $C_8$ $\alpha,\beta$ ethylenically unsaturated carboxylic acid, and Y is a comonomer selected from acrylate and methacrylate esters, wherein X is from about 2 to about 30 weight % of the E/X/Y copolymer and Y is from 0 to about 50 weight % of the E/X/Y copolymer; and (ii) from 0 weight % to about 30 weight % of one or more organic acids or salts thereof; where the combined carboxylic acid functionalities in all ingredients in the composition are at least partially neutralized by one or more rare earth metal cations.

Preferred comonomers are acrylate or methacrylate esters of $C_1$ to $C_8$ alcohols. X and Y can be present in a wide range of percentages, X typically up to about 30 weight percent (weight %) of the polymer and Y typically up to about 50 weight percent of the polymer.

More preferred for use in this invention is a composition comprising:

(i) at least one E/X/Y copolymer where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from one to eight carbon atoms, wherein X is from about 2 to about 30 weight % of the E/X/Y copolymer and Y is from 0 to about 40 weight % of the E/X/Y copolymer; and (ii) from about 1 weight % to about 30 weight % of one or more organic acids or salts thereof;

wherein the combined carboxylic acid functionalities in all ingredients in the composition are at least partially neutralized by a rare earth cation selected from europium or terbium and optionally one or more additional rare earth cations.

The copolymer(s) of alpha olefin, $C_3$ to $C_8$ $\alpha,\beta$ ethylenically unsaturated carboxylic acid and (meth)acrylate ester comonomer from which the melt processible ionomers described above are prepared can be made by methods known in the art. The copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, and ethylene/(meth)acrylic acid/ethyl (meth)acrylate terpolymers. Ethylene acid copolymers suitable for use in this invention include the copolymers available under the Nucrel® tradename from DuPont.

Neutralization can be effected by first making the E/(M)AA copolymer and treating the copolymer with inorganic base(s) with rare earth cation(s). Methods for preparing ionomers from copolymers are well known in the art. The copolymers are melt-processible, at least partially neutralized copolymers of ethylene and $C_3$ to $C_8$ $\alpha,\beta$ ethylenically unsaturated carboxylic acids. The resulting ionomer(s) can be melt-blended with modifiers and/or other polymers. To achieve desired higher neutralization the resulting ionomers can be further neutralized. The ionomer(s) optionally can be blended with organic acids to prepare compositions useful in this invention. Alternatively, the non-neutralized ethylene acid copolymers, and optional organic acids are melt-blended and then neutralized with rare earth cations in situ. In this case the desired level of neutralization can be achieved in one step.

As indicated above, the ethylene acid ionomers optionally can be melt-blended with modifiers such as organic acids, or salts thereof, to facilitate fine, uniform dispersion of the rare earth cations in the polymer matrix. The composition of the invention therefore relates to the above copolymers optionally melt-blended with organic acids or salts thereof. The organic acids that may be optionally employed in the present invention are particularly those that are non-volatile and non-migratory. By non-volatile, it is meant that they do not volatilize at temperatures of melt blending with the rare earth ion and the acid copolymer. By non-migratory, it is meant that the agent does not bloom to the surface of the polymer under normal storage conditions (ambient temperatures). Organic acids that may be employed in the present invention include aliphatic, mono-functional (saturated, unsaturated, or multi-unsaturated) organic acids, particularly those having from 6 to 36 carbon atoms. Also salts of these organic acids may be employed. Fatty acids or fatty acid salts are preferred. Particular organic acids useful in the present invention include caproic acid, caprylic acid, capric acid, lauric acid, stearic acid, behenic acid, erucic acid, oleic acid, and linoleic acid. Stearic, linoleic and oleic acids are preferred.

Processes for organic acid (salt) modifications of ionomers are known in the art. Particularly, the organic acid (salt)-modified acid copolymer ionomers of this invention can be produced by (a) melt-blending (1) ethylene, $\alpha,\beta$ ethylenically unsaturated $C_3$ to $C_8$ carboxylic acid copolymer(s) or melt-processible ionomer(s) thereof (including copolymers with the optional addition of a (meth)acrylate ester comonomer) with non-volatile, non-migratory organic acids, and concurrently or subsequently (b) adding a sufficient amount of a source of rare earth cations optionally in the presence of added water to achieve the desired level of neutralization of all the acid moieties, including those in the acid copolymer, and, if present, the non-volatile, non-migratory organic acids.

Compositions with mixed rare earth ions can be prepared by treating an already partially neutralized ionomer (or blend thereof) with an alternate cation source. For example, an ionomer blend at least partially neutralized by europium can be modified by melt-processing with an amount of terbium acetate sufficient to neutralize at least some of the remaining acid functionalities into an ionomer with a mixture of europium and terbium ions.

The ethylene acid ionomer compositions of this invention are at least partially neutralized by at least one of the rare earth metal cations. Preferably at least 30%, alternatively at least 45%, alternatively at least 50%, alternatively at least 60% of the available acid moieties in the composition are neutralized by at least one of the rare earth metal cations and by one or more alkali metal, transition metal, or alkaline earth cations as needed to achieve the desired level of neutralization. Rare earth cations are selected from the group consisting of europium, gadolinium, terbium, dysprosium, holmium, erbium and thulium (element numbers 63 through 69 of the Periodic Table of the Elements), or a combination of such cations. The preferred rare earth elements for use in the invention herein are element numbers 63 through 65; more preferably 63 and 65 (europium and terbium); and most preferably 63 (europium). When a combination of rare earth cations is used, a preferred combination comprises europium and terbium. alkali metal, transition metal, or alkaline earth cations are selected from the group consisting of lithium*, sodium*, potassium, magnesium*, calcium, barium, lead, tin, or zinc* (* indicates a preferred cation).

As indicated above, each of the rare earth ions luminesces with a characteristic spectrum. When a composition comprises more than one rare earth ion, the fluorescence emission spectrum will be a combination of the spectra expected from the individual rare earth ions and therefore unique to the composition. The relative amplitude of the emission lines in the combination spectrum will be dependent on the ratio of the rare earth ions present in the composition. In addition, the decay times for the individual emission wavelengths will be characteristic of the rare earth ions in the composition.

Preferred transparent, luminescent polymer compositions useful in this invention comprise acrylic polymers such as copolymers of methyl (meth)acrylate and (meth)acrylic acid complexed with the rare earth ions.

For acrylic polymers, the transparent, luminescent polymer composition is preferably formed from a monomer composition made by mixing the rare earth compound(s) and the selected monomers at a temperature of between 10° C. and the boiling point of said mixture, preferably at about 30° C. to about 80° C., until a clear solution is formed. In addition, short chain fatty acids of the general formula $R^1COOH$, where $R^1$ is $C_5$-$C_{36}$, (as described in more detail above) can be added to the monomer composition before polymerization.

Addition of organic acids to the composition leads to an improvement in the toughness and transparency of the final material, especially for compositions containing high levels of rare earth ion. The method of addition and order thereof are not limited.

More preferred for use in this invention is a composition comprising:

(i) a copolymer comprising at least one alkyl acrylate or alkyl methacrylate and at least one acid selected from acrylic acid or methacrylic acid; and (ii) from about 1 weight % to about 30 weight % of one or more organic acids or salts thereof;

wherein the combined carboxylic acid functionalities in all ingredients in the composition are at least partially neutralized by a rare earth cation selected from europium or terbium and optionally one or more additional rare earth cations.

The reaction mixture is initially a heterogeneous suspended system, but as the reaction proceeds the rare earth ions dissolve and a clear reaction solution can be obtained. By-products, such as water, acetic acid and acetyl acetone are formed by reaction, depending on the reactants used, and are generally dissolved in the monomer composition. These by-products need not necessarily be removed prior to polymerization. However, volatile by-products can cause bubbles in the polymer, opacity and reduction of solvent resistance and the like, so they may be removed by azeotropic distillation and the like, after synthesis of the monomer composition when the occasion demands, especially when the highest possible transparency is desired. In order to inhibit the polymerization during preparation of the monomer composition, it is generally preferable to use the least necessary amount (preferably less than 300 parts per million) of a conventional polymerization inhibitor such as hydroquinone, monomethylether, 2,4-dimethyl-6-tert-butyl phenol, etc.

Alternatively, transparency can be improved by the removal of by-products such as, but not limited to, water, acetic acid, and acetyl acetone after polymerization (a first processing step) in a second purifying processing step. An example of a second purifying step would be to subject the polymerized composition to a temperature greater than the boiling point of the species being removed. Furthermore, application of pressure during this second processing step may accelerate removal of the unwanted by-product(s).

The transparent, luminescent polymer in accordance with the present invention can be prepared by polymerizing the monomer composition in the presence of a radical polymerization initiator in a mold, an extruder, or directly on an article. The reaction can utilize initiators that are either activated thermally or through exposure to radiation such as ultraviolet light (UV). Thermally initiated polymerization reaction is effected at a temperature usually between −10° C. and 150° C. and preferably from about 40° C. to about 130° C. The initiator for radical polymerization is used usually in an amount of from about 0.001 to about 5% and preferably, 0.02% to 1.0% by weight of the total monomer used. Typical examples of thermal initiator include lauroyl peroxide, tert-butyl peroxyisopropyl carbonate, benzoyl peroxide, dicumyl peroxide, tert-butyl peroxyacetate, tert-butyl peroxybenzoate, di-tert-butyl peroxide, 2,2'-azo-bis-isobutyinitrile, and the like. Typical classes of chemical compounds that are useful as UV initiators for initiating the free radical polymerization of the disclosed compositions are alpha-hydroxyketones and alpha-amino-ketones.

Some of the transparent, luminescent polymer compositions useful in this invention are also paramagnetic (i.e. within which an induced magnetic field is in the same direction as and greater in strength than an applied magnetizing field resulting from the alignment of electron orbits). Preferably, the polymer in these compositions is complexed with a sufficient amount of one or more rare earth ions to provide a polymer composition with a magnetic mass susceptibility of greater than $20 \times 10^{-6}$ (preferably greater than $25 \times 10^{-6}$) emu/g measured at 298° K. The paramagnetism may be used as a further means for authentication of the identity of the composition.

Other copolymerizable monomers, crosslinking agents, coloring agents such as dyes and pigments, antistatic agents, flame retardants, etc. may be added to the composition when they are subjected to polymerization to such extent as to give no adverse results to the beneficial effects of the present invention.

It has also been found important to minimize the amount of foreign particles in the core polymer, because they absorb or scatter light and thus increase the attenuation of transmitted light. The process of the present invention is therefore designed to meet this goal. Transfers of the various substances are preferably carried out to the extent possible in a sealed or closed system so that recontamination of purified materials by dust, dirt or particulate matter of any kind does not occur. Particles introduced by adventitious contamination are advantageously removed as the polymerization charge is transferred to the polymerization vessel. Removal of particles larger than a size within the range of from 0.2 to 1 micrometer is conveniently done at this stage. Filtration or centrifugation can remove particles. Filtration is preferred because of its convenience.

Uses as a Transparent Marker

The transparent, luminescent polymers as described herein are useful for transparent marking, labeling or identification purposes, such as those used for product identification, product tracking and anti-theft applications. Such labeling is unobtrusive and still easily and quickly detectable by using known luminescence detectors.

By using the transparent, luminescent polymers described herein for labeling, it is possible to provide a label itself that would be essentially invisible to the human eye under normal lighting conditions. That is, the label would be free of optical detection by a person with 20/20 vision from a distance of 1 meter (3 feet) or more. Polymer transparency preferably is such that at least 55% (preferably at least 65%, more preferably at least 75%) of the incident light/radiation can be transmitted through an eighth (⅛) inch thick test piece of the label material for greater than 50% of the wavelengths in the range of 400 to 1800 nanometers (nm) as measured according to ASTM D1746-97.

Particular transparent, luminescent polymer compositions useful for such labeling applications comprise polymers complexed with a sufficient amount of one or more rare earth ions to provide a polymer composition such that at least one emission wavelength peak, characteristic of the rare earth luminescence, is observable. The compositions described above are particularly useful for labeling applications.

The transparent, luminescent polymer can be applied as a film, particle, fiber, or ink to the article being labeled by a bonding means such as by a thermal bond, covalent bond, and/or a polar bond. For labeling applications, the application of clear, luminescent particles as is done in ink jet printing is preferred. In one embodiment of this invention, the label is preferably applied in a pattern, even more preferably as a bar code such as is conventionally used in many commercial applications today.

Transparent, luminescent labels on the surface of a labeled article are preferred. The transparent, luminescent label can be applied as a bonded film and/or composition. An adhesive bond is a preferred bonding mechanism. A thermal bond is a preferred bonding mechanism. A radiation-cured bond can be a preferred bonding mechanism. The film and/or composition can be pre-shaped before bonding to indicate certain coded information. The film and/or composition can be shaped to indicate certain preferred coded information after attachment by such methods as laser etching and/or mechanical shaping mechanisms (e.g. cutting, abrading, etc.). An example of coded information can be a bar code and/or a recognizable pattern. Various methods of printing (e.g., ink jet, flexographic, screen, letterpress, gravure, and offset printing) can as also be used. Zone coating of the transparent, luminescent compositions of this invention onto a substrate may also be employed.

The transparent, luminescent compositions useful in this invention can be used in monolayer or multilayer structures to impart their luminescent properties to these structures. These structures include films or sheets. Preferably, the transparent, luminescent composition is applied as the outermost layer in a multilayer structure so that its luminescent properties can be readily observed by appropriate means of detection. Alternatively, the transparent, luminescent composition may be covered by another layer of polymeric material, provided the additional polymeric material is transparent to the excitation and emitted radiation.

For purposes of the present invention, the monolayer or multilayer structures may be used as label material that may optionally be further printed, embossed or otherwise processed to provide graphic designs or information. A particular example of a multilayer structure useful as a label comprises a substrate printed with graphic information such as alphanumeric text, a bar code and/or a recognizable pattern that has a coating or varnish of a luminescent composition as described above applied to its surface. The substrate can be selected from, but not limited to, paper (including, but not limited to, currency, checks, stocks and bonds), cardstock, leather, cloth, plastic, polymeric resin, glass and metal. The mixture may be depositing by a variety of techniques such as extrusion coating, lamination, brushing, spraying, dripping, printing, copying, writing and doping. Such labels can be used to tag, mark and/or identify an article to which the label is affixed for product identification, product tracking and anti-theft applications. Alternatively, the monolayer or multilayer structures may be used in sheets of polymeric film employed to make wrapper sheets for packages to contain an article to be tagged, marked and/or identified.

In principle, any film-grade polymeric resin or material as generally known in the art of packaging can be employed as a substrate to which a layer of the transparent, luminescent compositions useful in this invention may be adhered. Preferably, a multilayer polymeric film structure is to be employed. Typically, in addition to the layer of the transparent, luminescent composition, the multilayer polymeric sheet will involve some or all of the following categorical layers including: a structural or abuse layer, a barrier layer, and an innermost layer making contact with and compatible with the intended contents of the package and optionally capable of forming seals to form a package (e.g. most preferably heat-sealable). Other layers may also be present to serve as adhesive or "tie" layers to help bond the layers together.

The structural or abuse layer is typically oriented polyester or oriented polypropylene, but can also include oriented polyamide (nylon). This layer preferably is reverse printable.

The multilayer film can include one or more barrier layers, depending on which atmospheric conditions (oxygen, humidity, light, and the like) that potentially can affect the product inside the package. Barrier layers can be, for example, metallized polypropylene (PP) or polyethylene teraphthalate (PET), ethylene vinyl alcohol (EVOH), polyvinyl alcohol (PVOH), polyvinylidene chloride, aluminum foil, nylon, blends or composites of the same as well as related copolymers thereof.

The structure and barrier layers can be combined to comprise several layers of polymers that provide effective barriers to moisture and oxygen and bulk mechanical properties suitable for processing and/or packaging the product, such as clarity, toughness and puncture-resistance. Examples of multilayer barrier structures suitable for use in this invention include, from outermost to innermost:

polyethylene/tie layer/polyamide/tie layer/polyethylene;
polypropylene/tie layer/polyamide/EVOH/polyamide; and
polyamide/tie layer/polyethylene/tie layer/polyamide.

The innermost layer of the package is the sealant. The sealant is selected to have minimum effect on taste or color of the contents, to be unaffected by the product, and to withstand sealing conditions (such as liquid droplets, grease, dust, or the like). The sealant is typically a polymeric layer or coating that can be bonded to itself (sealed) at temperatures substantially below the melting temperature of the outermost layers so that the outermost layers' appearance will not be affected by the sealing process and will not stick to the jaws of the sealing bar. Typical sealants used in multilayer packaging films useful in this invention include ethylene polymers, such as low density polyethylene (LDPE), linear low density polyethylene (LLDPE), metallocene polyethylene (mPE), or copolymers of ethylene with vinyl acetate (EVA) or methyl acrylate or copolymers of ethylene and acrylic (EA) or methacrylic acid (EMA), optionally as ionomers (i.e., partially neutralized with metal ions such as Na, Zn, Mg, or Li). Typical sealants can also include polyvinylidene chloride (PVDC) or polypropylene copolymers.

The transparent, luminescent composition may be applied to the entire area of the multilayer packaging film (for example, by coextrusion or extrusion coating) or it may be applied to a portion or portions of the area (for example, by printing or zone coating). When applied to a portion of the area of the packaging film, it may be applied as graphical design elements such as, but not limited to, distinguishing marks, bar codes and/or alphanumeric text.

The transparent, luminescent compositions useful in this invention also can be used in multilayer structures in which the luminescent composition is adhered (for example, by coextrusion or lamination) to other polymeric compositions that have identifying characteristics such as color or luminescence to provide a taggant. The selection and order of the polymeric composition in the multilayer structure can provide an identifying code. For example, a multilayer film or sheet comprising at least one transparent, luminescent composition of this invention and at least one other identifiable polymer can be prepared and cut into small portions to provide taggants that can be mixed with bulk powders for identification and tracking purposes.

Methods of Detection

The use of the transparent, luminescent polymer compositions is dependent on one's ability to determine the presence (or absence) of the composition on or in a labeled article. As indicated above, under ordinary illumination the compositions are transparent and therefore invisible to the unassisted human eye. When illuminated with an appropriate light source, for example an ultraviolet light source, the electrons in the rare earth ion are placed into an excited state. When they return to their ground states, they emit a characteristic fluorescence spectrum. For example, europium-containing compositions fluoresce at a wavelength of about 617 nm (orangish-red) and terbium-containing compositions fluoresce at a wavelength of about 542 nm (green).

For detection of fluorescence, it is necessary to have a source of excitation energy and means for detecting the emission energy. Excitation energy can be supplied by a broad-band light source, such as a ultraviolet lamp (a "black light") or a light source tuned to specific excitation wavelength(s).

Means for detecting luminescent emissions include the unassisted human eye, the human eye aided by the use of light amplification devices such night vision goggles or, alternatively, a photosensitive detection device tuned to the appropriate wavelength(s).

For example, an article labeled with a luminescent composition according to this invention can be illuminated with an excitation light and the luminescent emission can be detected by the unassisted vision of a human observer.

However, the human eye is subject to fatigue, slowness of response and a tendency to respond more readily to dominant colors. In addition, natural variation among human eyes limits their ability to be used for definitive identification of a specific fluorescence pattern of a composition when used as label or tag for an article. Furthermore, human eyes are unable to determine the radiant power level except by comparison to a reference.

In comparison to the human eye, use of a detection device allows for more definitive identification of a composition used as label or tag in accordance with this invention. Detection devices can be designed, for example, to discriminate particular wavelengths and/or to compare the amplitudes of two or more wavelengths. They can also be much more sensitive to low levels of fluorescence that the human eye. Detection devices typically include a means for measuring the incident radiation energy. These means include, for example, barrier-layer or photovoltaic cells, photoemissive tubes, electron multiplier phototubes (photomultiplier tube). Detection devices include, for example, fluorescence scanners, fluorometers or spectrophotometers, digital cameras, photomultipliers (PMT), charge coupled devices (CCD), or time-delay integrating (TDI) CCDs that detect photons from objects as they travel relative to the detector. Detection devices also typically include means of isolation of more or less narrow wavebands of radiant energy. These include, for example, filters such glass absorption filters, cutoff filters, interference filters, multilayer interference filters and continuously variable transmission interference filters; prisms and gratings. An important aspect for many applications of the present invention is the selection of a photon-detecting device with sufficient sensitivity to enable the detection and imaging of faint light from the luminescent polymer composition in a reasonable amount of time to provide sufficient sample throughput. For example, the subject may be held within the detection field of a photon-detecting device for a length of time necessary to measure a sufficient amount of photon emission to construct an image. In cases where the luminescence is extremely bright, a pair of night-vision goggles or a standard high-sensitivity video camera, such as a Silicon Intensified Tube (SIT) camera may be used to detect the luminescence. It may also be possible to increase the luminescent intensity of a composition by treating it with ultrasound during observation. More typically, however, a more sensitive method of light detection is required. This is especially important if the decay pattern of the luminescent composition is to be observed.

The measurement of luminescence decay times may also be an important aspect for many applications of the present invention. The luminescent signals, referred to as "fingerprints", are unique to a given composition and the substrate to which it is applied. While it is not intended that the present invention be limited to any specific device by which delayed luminescence can be compared, in one embodiment of the present invention, the detection and comparison of wavelengths would be achieved using a variety of commercially available instruments. For example, the detection of luminescent radiation, in the recording of steady state emission and excitation spectra, can be carried out using a Photon Technology International, Inc., QuantaMaster luminescence spectrometer, model SE-900M. Emission lifetimes can be measured using a PTI TimeMaster fluorescence lifetime spectrometer, equipped with a GL-3300 nitrogen/dye laser as the excitation source (e.g. $\lambda_{exc}$=337 nm), a DG-535 delay/pulse generator and a strobe detector. Similar instruments, also capable of measuring luminescence decay times in the range from 100 picoseconds to seconds are also available from other vendors (e.g. Edinburgh Analytical Instruments FS900 spectroflourimeter system). These commercial instruments can be configured to record luminescence spectra and luminescence excitation spectra for the entire range of ultraviolet, visible and infrared wavelengths (e.g. 200-900 nm). Software available from the fluorimeter vendors is capable of decay time analysis including, for example, the computation of luminescence lifetimes, the determination of multiple exponential decay functions, and a statistical analysis of goodness-of-fit to the decay data.

In another embodiment, the comparison of luminescence may be carried out using devices of simple design that allow portability and ease of operation by personnel having minimal training in the field of luminescence spectroscopy. For example, a compact hand-held apparatus can be fabricated that incorporates a readily available emitting diode light source, and inexpensive diode detector, and simple circuitry that can be understood and implemented by persons skilled in the art of detector electronics. Such a device is illustrated in the description of a UV-scanning apparatus, constructed from available optical and electronic components, that has the capability of discriminating slow-decaying luminescence. These components include a very low-leakage Hamamatsu photodiode (R2506-02), a high impedance (10-12 ohm) FET operational amplifier (TLO 64), CMOS analog switches (74HC 4066), and a MOSFET low on resistance transistor (IRF 7503) for UV modulation. Utilizing a double differential scheme, the apparatus is relatively insensitive to ambient light and/or temperature changes. Extremely weak signals of luminescence can be sensed by the low-leakage photodiode, if signals are amplified and averaged over multiple periods of the clock generator (LM311) to improve the signal/noise ratio.

With extremely low light levels, such as those that may be encountered in the practice of the present invention, the photon flux per unit area can become so low that the scene being imaged no longer appears continuous. Instead, it may be represented by individual photons, which are both temporally and spatially distinct from each other. Viewed on a monitor, such an image typically appears as scintillating points of light, each representing a single detected photon. Nevertheless, by accumulating these photons in a digital image processor over time, an image can be acquired.

At least two types of photon-detecting devices, described below, can detect individual photons and generate a signal that can be analyzed by an image processor.

Photon Amplification Devices

This class of sensitive photon-detecting devices employs additional devices to intensify single photon events before they reach the detector. This class includes CCD cameras with intensifiers, such as microchannel intensifiers. An exemplary microchannel intensifier-based single photon detection device is the C2400 system, available from Hamamatsu Photonic Systems (Bridgewater, N.J.). A microchannel intensifier typically contains a metal array of channels perpendicular to, or at a slight angle to, the detection screen, which is co-extensive to and positioned in front of the detector screen. A photocathode device is positioned between the microchannel array and the sample. A photon striking the photocathode causes the ejection of an electron, which enters the microchannel array. Most of the electrons that enter the microchannel array contact a side of the channel before exiting. A voltage applied across the array results in the release of many electrons for each electron collision. The resulting electron clouds exit the microchannel array and are detected by the camera. Even greater sensitivity can be achieved by placing intensifying microchannel arrays in series, resulting in an even greater amplification of the original photonic signal. However, it is noted that the increase in sensitivity achieved by the use of microchannel arrays to intensify the photonic signal is gained at the expense of spatial resolution. Some applications of the present invention that detect area of coverage or a graphic element as the metric for identity require high spatial resolution.

Reduced-Noise Photon-Detection Devices

This class of photon-detecting devices achieves sensitivity by reducing the background noise in the detector, as opposed to amplifying the signal. Noise is primarily reduced by cooling the detector array, thereby reducing the dark current (i.e., electrical current that results from leaks in the circuitry of the instrument) and, most significantly, accumulates at the detector head. The deeper the cooling (by, for example, liquid nitrogen, which can reduce the temperature of the CCD array to about −120° C.), the more sensitive the detector. More sensitive versions of these cooled devices include CCD arrays referred to as "backthinned" that may be operated in a back illuminated mode. "Backthinned" refers to an ultrathin backplate of the CCD array. Thinning the CCD array reduces the path length a photon must travel to be detected, and coupled with the back illumination, avoids light absorption by the polysilicon gates at the front of the CCD array, thus greatly improves the quantum efficiency of the detector. In addition, a new CCD technology called multi-pin phasing (MPP), by reducing the potential at the surface of the CCD during the exposure time, can reduce dark current by a factor of 100 or more. Detectors are available that employ all of these technologies (i.e., cooling, backthinned, back illuminated arrays, and MPP) for optimal camera performance. An exemplary reduced-noise photon-detection camera employing all of these technologies, and yet providing excellent high-resolution characteristics (1317×1035 imaging array with 6.8×6.8 gm pixels), is the SenSys81401 E camera system, available from Roper Scientific (Tucson, Ariz.).

Camera systems are also available that combine both photon amplification and noise reduction technologies (e.g., a cooled, intensified CCD). Such camera systems are generally very sensitive for light detection, but provide somewhat lower spatial resolution than cameras employing solely noise reduction technologies.

Image Processors

Signals generated by photon-detecting devices that count single photons typically need to be processed by an image processor in order to construct an image that can be, for example, displayed on a monitor, printed, recorded, and/or compared to a reference image for authentication. The detection of photon emission generates an array of numbers, representing the number of photons detected at each pixel location, in the image processor. These numbers are used to generate an image, typically by normalizing the photon counts (either to a fixed preselected value, or to the maximum number detected in any pixel in the field) and converting the normalized number to a brightness (grayscale) or to a color (pseudocolor) that is displayed on a monitor. In a grayscale presentation, typical color assignments are as follows. Pixels with zero photon counts are assigned black, low counts are assigned shades of gray, and white is assigned for pixels having the highest photon counts. The locations of the gray and white pixels on the monitor represent the distribution of photon emission, and, accordingly, the location of the light generating moieties.

Image processors are typically sold as part of systems that include the sensitive photon-counting cameras described above, and accordingly are available from the same sources (e.g., Hamamatsu and Roper Scientific). The image processor can be connected to a personal computer, such as an IBM-compatible PC or an Apple Macintosh, that may or may not be included as part of the purchased camera system. After the images are in the form of digital files, they can be manipulated and analyzed with a variety of image processing programs, including software applications available from the camera system vendors, other commercial applications such as MetaMorph (Universal Imaging, West Chester, Pa.) or Adobe Photoshop (Adobe Systems, Mountain View, Calif.), or custom software applications.

Imaging System Integration

One macro imaging system that can be used in the present invention is an integrated, computer-controlled instrument. In this example of the imaging system, the configuration is such that the samples to be authenticated are placed in the base of the imaging chamber, and the camera focuses downward. However, in some applications of the methods it may be desirable to have the camera mounted on the side of the chamber. Still other configurations of the camera relative to the samples to be imaged may be used for other applications of the methods.

When used in the luminescence mode, the excitation light in this example can be produced by dual-light sources (e.g. DCR@ 11 LITE SOURCE available from Optical Apparatus Co., Inc., Ardmore, Pa.), each fitted with the appropriate bandpass filters (for example filters available from Omega Optical, Brattleboro, Vt.) and coupled with a fiber optic bundle to a 14"×0.015" (35.6 cm.×0.038 cm) fiber optic line light (e.g. Lightline available from Optical Apparatus Co., Inc., Ardmore, Pa.). The line lights are mounted inside the imaging chamber out of the field of view of the camera, and oriented to provide flat-field illumination, without spectral reflectance, across the imaging field of view. Low wattage white lights covered by a diffuser are also mounted inside the chamber and can be used to provide flat-field, nonreflecting illumination for the collection of white light reference images. Establishing uniform excitation and reference light conditions without spectral reflectance is important for some applications of the present invention, particularly when flat transparent materials such as Lucite polycarbonate or Mylar polyester are used to hold samples in a single plane for improved image accuracy, or when the sample contains reflective material. Optionally, an additional flat bed reference light may be placed in the base of the imaging chamber to backlight samples relative to the camera.

Luminescence may be detected by a camera (e.g. a SenSys8 1401 E cooled CCD camera (Roper Scientific, Tucson, Ariz.), fitted with a macro photographic lens, such as an AF Nikkor 35 mm f2.0 lens (available from Nikon, Inc., Melville, N.Y.), and an appropriate emission filter (for example a filter available from Omega Optical, Brattleboro, Vt.), and connected to an image processor having a 16-bit frame grabber.

Operation of the Lighting Systems for Luminescence and for Reference Images

Operation of the lighting systems for luminescence and for reference images and of the CCD camera is controlled by a computer. A multifunction 1/0 board (e.g. one available from National Instruments, Austin, Tex.) is installed in the computer for the control of the excitation and reference lights.

Software drivers for the operation and control of the camera are generally provided by the camera manufacturer and are installed on the computer. For example, a customized image analysis software program installed on a PC running the Microsoft Windows NTS operating system can control the lighting and camera operation.

VI. Image Acquisition and Analysis

Samples to be imaged are placed within the imaging chamber with orientation relative to the camera and dependent upon the substrate format. The field of view with a 35 mm macro lens may accommodate one or more samples, depending on their size and the working distance. Larger fields of view, and therefore increased throughput can be achieved with the use of shorter focal length lenses, such as 28 or 24 mm lenses. A field lens can be helpful for correcting parallax. However, such lenses generally are optically slow and may reduce the amount of light detected. In some applications of the methods, it may be desirable to orient the sample so that it presents a substantially single plane to the camera, thereby providing a consistent and uniform presentation of the sample for illumination and detection by the camera. Sheets of glass, polycarbonate, flexible Mylar® polyester or other transparent material may be used to help orient the samples into a single plane. Depending on the type of analysis required, both surfaces of the sample can be easily imaged with such oriented samples.

Luminescence data are ordinarily acquired in the presence of the excitation illumination. The integration times may be adjusted according to the intensity of the light signal, which is dependent upon the nature of the luminescent composition, the spectral characteristics of the luminescent light generated. Integration times may also need to be adjusted according to whether authentication is dependent on observation of a luminescence spectrum and/or a graphic image that requires mapping and comparative analysis. A grayscale reference image of the sample can be acquired under white light using the macro imaging system, if desired.

All data output from the imaging system is digitized and easily input into a spreadsheet or data handling system of choice for further analysis and archiving. For the purposes of this invention, the luminescence emission of a sample can be compared to a reference for authentication. For example, the total emission spectrum can be compared to a reference spectrum stored in the analysis software to analyze for identity and authentication of the sample. A luminescent image, such as an alphanumeric code and/or a graphic design, may be mapped by an image analyzer and compared to a reference image. The alphanumeric code can be registered to provide information about the sample, such as its source, time and place of preparation, etc.

The coding of luminescence information can be stored or transmitted as data for recovery and use in the verification of product or document identity. The storage and transmission of data for recovery may be accomplished via any type of cable or wire, and is not limited to any particular distances. Rather, the present invention may be used to achieve the storage and transmission of data for recovery from one physical point to one or several other specified locations.

The authentication software may be linked to additional data collection software. For example, the information from the sample authentication analysis may be linked to information related to the time and place of the analysis. These data are useful in providing information on inventory control and tracking of articles labeled with the luminescent composition according to this invention.

EXAMPLES

The following examples demonstrate the effectiveness of producing transparent, luminescent polymers that contain rare earth salts. These polymers luminesce with a characteristic spectrum and decay lifetime that can be detected and characterized as indicated below.

Examples 1-4

Example 1 was prepared by heating methyl methacrylate, oleic acid, and methacrylic acid to 90° C. while stirring in a round-bottomed glass flask. Europium acetate was prepared for use by drying Europium acetate hydrate (Aldrich) in a vacuum oven for 48 hours at 80° C. Europium acetate was then added to the contents of the glass flask and the composition was mixed until the solution became clear. The solution was then cooled to 50° C. and Irgacure® 184 initiator (Ciba) was added. The composition with initiator was then poured into a mold comprised of two glass plates placed face to face sealed with a rubber gasket. The filled mold was then placed under a 365 nm UV lamp for 4 hours at room temperature. After the synthesis was complete, the material was removed from the mold.

Examples 2-4 were prepared similarly.

Examples 5-7

Examples 5-7 were based on an ethylene-methacrylic acid random copolymer. Example 5 is based on an ethylene/15 weight percent methacrylic acid copolymer, while Examples 6-7 are based on an ionomer made by neutralizing 51% of the acid groups in an ethylene/15 weight percent methacrylic acid copolymer with sodium (Na). Examples 5-6 used europium triacetylacetonate hydrate (EuAcAc) (Aldrich, Milwaukee, Wis.) that was dried for 48 hours at 80° C. in a vacuum oven, and Example 7 contained dried Europium acetate hydrate, similar to Examples 1-4, as the Europium source.

For Examples 5-7, a Haake mixer was heated to 180° C. and the ethylene copolymers were placed in the mixing bowl. The EuAcAc or Europium acetate was then slowly added to the material and the components were mixed for 10 minutes. The blended material was then removed from the mixing equipment and allowed to cool to room temperature. The blended material was then placed in a 4×6×⅛ inch mold and compression molded at 180° C. for 15 minutes. This final step allowed the reaction to be completed forming the polymer-rare earth salt, and the material was then cooled to room temperature and removed from the mold.

Examples 6 and 7 were prepared similarly.

Table 1 presents the materials and weight percent of components used to prepare the Examples as well as the appearance of the final sheet formed from the composition.

TABLE 1

| | | weight % of component initially mixed | | | | |
|---|---|---|---|---|---|---|
| Example | Lanthanide salt | Eu salt | Oleic acid | MAA | Balance | Appearance |
| 1 | Eu(III) acetate | 18.1 | 17.5 | 21.3 | MMA | clear, some haze |
| 2 | Eu(III) acetate | 1.9 | 3.6 | 2.2 | MMA | clear, uniform |
| 3 | Eu(III) acetate | 3.8 | 3.7 | 4.4 | MMA | clear, flat center |
| 4 | Eu(III) acetate | 9.1 | 8.8 | 10.7 | MMA | clear, very rippled |
| 5 | Eu(III) acetylacetonate | 1 | | E/15 wt % MAA | | clear, uniform |
| 6 | Eu(III) acetylacetonate | 1 | | E/15 wt % MAA-Na+ | | clear, uniform |
| 7 | Eu(III) acetate | 1 | | E/15 wt % MAA-Na+ | | clear, some specks |

All spectra were acquired using the following conditions using a Spex Fluorolog 3 instrument equipped with a Hamamatsu R928 photomultiplier detector. The excitation gratings were configured at 1200/mm and blazed at 300 nm, and the detector grating was configured at 1200/mm and blazed at 500 nm. Excitation spectra were detected at 617 nm, all slits at 1 nm, using an orange-red longpass filter (Corning 3-67). The sample clip was mounted angled at 45° and the luminescence observed at 90°. The emission spectra were excited at 365 nm except where noted, all slits at 1.5 nm with no filters. Emission/excitation spectra source was a 450 W Xenon lamp and the phosphorescence source was a pulsed Xenon lamp. The phosphorescence decay curve was determined using a standard run of 0 to 3 miliseconds, excited at 365 nm and detected at 617 nm, with data points collected in increments of 0.02 milliseconds and 400-999 pulses per point.

The initial Europium ion content for the samples, presented in Table 2, was calculated based on the weight percent of Europium ions added relative to the total weight of all reactants, using the molecular weight of Europium(III) acetate of 329.10 g/mol, the molecular weight of Europium (III) acetylacetonate of 449.29 g/mol, and the molecular weight of Europium of 151.96. For example, the calculation of Europium content for Example 1 is as follows: [(151.96/329.10)*18.1]/[18.1+17.51+21.3+43.09]=8.4/100=8.4 wt % $Eu^{3+}$ By removing by-products of the reaction after the production of the Europium/polymer complex (such by-products as acetic acid in Examples 1-4 and 7, and acetyl acetone in examples 5 and 6), the final Europium ion content is calculated to be higher.

The maximum intensities of the 617 nm emission peak and the decay times reported in Table 2 are averages from at least three measurements on each sample. The decay times reported were calculated by fitting a single exponential curve [I=Io exp(−kt)] to the luminescence data at 617 nm. The decay times are reported in milliseconds and are equal to 1/k in the above equation.

TABLE 2

| Sample | Initial Europium Ion Content (wt %) | 617 nm Maximum Intensity (cps) | Decay time (ms ± 0.01) |
|---|---|---|---|
| 1 | 8.4 | 466000 | No data |
| 2 | 0.88 | 102000 | 0.96 |
| 3 | 1.8 | 139000 | 0.99 |

TABLE 2-continued

| Sample | Initial Europium Ion Content (wt %) | 617 nm Maximum Intensity (cps) | Decay time (ms ± 0.01) |
|---|---|---|---|
| 4 | 4.2 | 186000 | No data |
| 5 | 0.34 | 69000 | 0.88 |
| 6 | 0.34 | 190000 | 0.92 |
| 7 | 0.46 | 106000 | 1.20 |

What is claimed is:

1. A monolayer or multilayer sheet or film for use as a marker, label, taggant or packaging film comprising at least one layer of a transparent, luminescent polymer composition wherein
   the composition comprises (1) at least one E/X/Y copolymer or copolymer of alkyl (meth)acrylate and (meth)acrylic acid and (2) one or more organic acids or salts thereof;
   E is ethylene, X is a $C_3$ to $C_8$ $\alpha,\beta$ ethylenically unsaturated carboxylic acid, and Y is alkyl acrylate or alkyl methacrylate in which each the alkyl group has one to eight carbon atoms; X is from about 2 to about 30 weight % of the E/X/Y copolymer and Y is from 0 to about 40 weight % of the E/X/Y copolymer;
   The (meth)acrylate is acrylate or methacrylate and the (meth)acrylic acid is acrylic acid or methacrylic acid; and
   the combined carboxylic acid functionalities in the composition are at least partially neutralized by a rare earth cation selected from europium or terbium and optionally one or more additional rare earth cations.

2. The sheet or film according to claim 1 wherein said transparent, luminescent polymer composition comprises at least one ethylene (meth)acrylic acid copolymer and (meth)acrylic acid refers to acrylic acid or methacrylic acid.

3. The sheet or film according to claim 1 wherein the organic acid or salt thereof is present in the composition said transparent, luminescent polymer
   from about 1 weight % to about 30 weight % of one or more organic acids or salts.

4. The sheet or film according to claim 1 wherein said transparent, luminescent polymer composition comprises the copolymer of alkyl (meth)acrylate and (meth)acrylic acid.

5. The sheet or film according to claim 4 wherein said transparent, luminescent polymer composition comprises from about 1 weight % to about 30 weight % of one or more organic acids or salts thereof.

6. The sheet or film according to claim 1, 2, 3, 4, or 5 wherein the amount of raze earth ions in said transparent, luminescent polymer composition is less than about 9 weight % based on the total weight of the polymer composition.

7. The sheet or film according to claim 1, 2, 3, 4, or 5 wherein said transparent luminescent polymer composition further comprises at least one additive that can also complex with the rare earth cations therein.

8. The sheet or film according to claim 6 wherein said transparent, luminescent polymer composition further comprises at least one additive that can also complex with the rare earth cations therein.

* * * * *

UNITED STATES PATENT AND TRADEMARK OFFICE
CERTIFICATE OF CORRECTION

PATENT NO. : 7,279,234 B2  Page 1 of 1
APPLICATION NO. : 10/921436
DATED : October 9, 2007
INVENTOR(S) : David M. Dean It is certified that error appears in the above-identified patent and that said Letters Patent is hereby corrected as shown below:

Column 22, line 19, change "raze" to --rare--

Signed and Sealed this

Eighteenth Day of March, 2008

JON W. DUDAS
*Director of the United States Patent and Trademark Office*